June 15, 1965 R. W. HABERKORN 3,189,359
SEALING RING WITH CORNER LIP
Filed Dec. 14, 1961
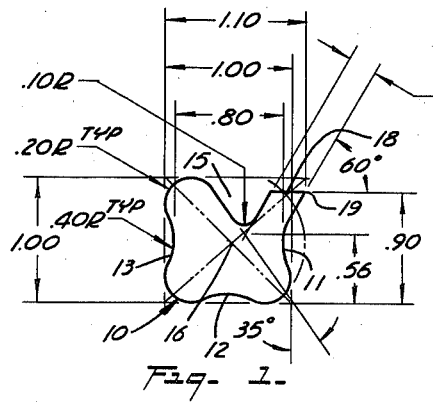
Fig-1-
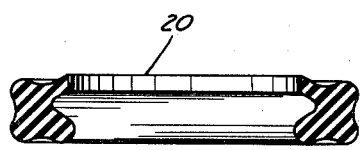
Fig-4-
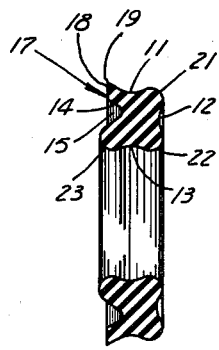
Fig-2-
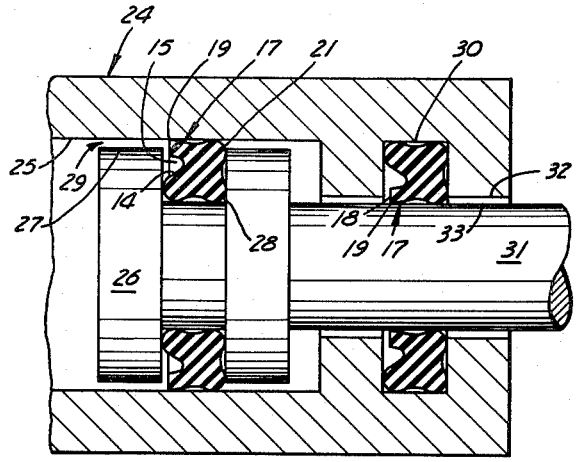
Fig-5-
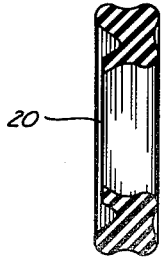
Fig-3-
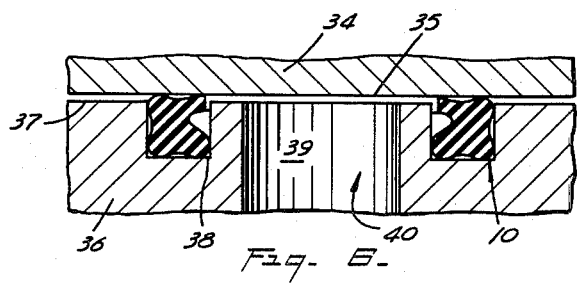
Fig-6-
INVENTOR.
ROBERT W. HABERKORN
BY Everett J. Schroeder
Kenneth D. Siegfried
ATTORNEYS

United States Patent Office 3,189,359
Patented June 15, 1965

3,189,359
SEALING RING WITH CORNER LIP
Robert W. Haberkorn, Minneapolis, Minn., assignor to Minnesota Rubber Company, Minneapolis, Minn., a corporation of Minnesota
Filed Dec. 14, 1961, Ser. No. 159,232
14 Claims. (Cl. 277—205)

This invention relates to sealing devices. More particularly, it relates to perfecting a seal between a pair of opposed surfaces under unusual circumstances by forming a groove in one of the surfaces and installing a sealing ring of unique cross-sectional configuration therein.

Under certain conditions it is desirable to perfect a seal between a pair of opposed surfaces which can be characterized by low interference and a small contact area to insure ease of relative movement of the two surfaces. An example of this is in automobile brakes. In such usages and in others it is also desirable to provide a maximum wiping action when traveling in the reverse direction in order to reduce to a minimum the thickness of the film which may have been left on the surface against which the seal is perfected. It is also desirable at times to have a sealing ring available which will function satisfactorily at both high and low pressures. My invention is directed toward providing a solution to these needs.

It is a general object of my invention to provide a novel and improved sealing device which is simple and inexpensive to manufacture and utilize.

A more specific object is to provide a novel and improved sealing device having a unique cross-sectional configuration which provides low interference and will permit maximum freedom of movement between the surfaces between which the seal is to be perfected.

Another object is to provide a novel and improved sealing ring which provides a pressure actuated seal yielding an efficient wiping action upon the sealing surface, low interference, and small contact or sealing area.

Another object is to provide a novel and improved sealing device which includes a pressure actuated seal capable of providing an efficient low interference, small contact sealing area seal with good wiping action at relatively low pressure and of also adequately sealing satisfactorily at high pressures.

These and other objects and advantages of my invention will more fully appear from the following description, made in connection with the accompanying drawings, wherein like reference characters refer to the same or similar parts throughout the several views, and in which:

FIG. 1 is a cross-sectional view of a section of the preferred embodiment of my invention with the approximate proportion indicated thereon.

FIG. 2 is a cross-sectional view of one of my sealing rings designed for use as an external seal.

FIG. 3 is a cross-sectional view of another of my sealing rings of the preferred type designed for use as an internal seal.

FIG. 4 is a cross-sectional view of another of my sealing rings designed for use as an internal face seal.

FIG. 5 is a vertical sectional view of a piston and cylinder assembly showing the external seal of FIG. 2 mounted therein at the left hand side of the drawing and the internal seal of FIG. 3 mounted therein at the right hand side of the drawing.

FIG. 6 is a fragmentary sectional view showing a pair of surfaces one of which has a sealing groove formed therein and containing the internal face seal of FIG. 4 to perfect a seal between the two surfaces.

The preferred embodiment of my invention shown in FIG. 1 is constructed in the form of a sealing ring which has been indicated generally by the numeral 10. The ring 10 is preferably made of a resilient flowable material such as rubber throughout and is adapted to be fitted into a sealing groove of ring-like configuration as illustrated in FIGS. 5 and 6. It will be noted by reference to FIG. 1 that the sealing ring in its free form is generally square in cross-sectional configuration and that each of its four sides are concavely shaped. Three of the sides indicated in FIGS. 1 and 2 as 11, 12, and 13 are of relatively shallow concavity and have the same radius. The fourth side 14, however, has a relatively large concavity 15 which extends inwardly the major portion of the distance toward the cross-sectional center which has been indicated in FIG. 1 by the numeral 16. This deep concavity 15 in cooperation with the adjacent side 11 defines an annular sealing lip indicated generally by the numeral 17.

As shown the sealing lip 17 has a flat end 18 and an acutely angled sealing contact 19 which is defined by the flat end surface 18 and the adjacent side 11. This contact 19 provides a minimum contact area and when followed around the ring provides a contact line indicated by the numeral 20 in FIGS. 3 and 4. The acutely angled contact portion 19 of the sealing lip 17 is in sharp contrast to the convexly shaped lobes 21, 22, and 23 at each of the other three corners of the sealing ring when considered cross-sectionally.

It will be noted by reference to the drawings that the flat end surface 18 of the sealing lip 17 of my sealing ring terminates short of the lobe at the opposite side of the large concavity 15, this particular lobe having been identified by the numeral 23. It will also be noted that the contact 19 of the sealing lip 17 extends outwardly beyond the lobe 21 of the adjacent side 11 to provide a cantilever projection mounting for the contact 19.

FIG. 2 illustrates a sealing ring of my unique cross-sectional configuration designed to perfect an external seal as illustrated in FIG. 5. It will be noted that in FIG. 5 there is shown a cylinder 24 having an internal surface 25 and a piston 26 having an external surface 27. The external seal mounted on the piston in the groove 28 provided for that purpose perfects the seal between the surfaces 25 and 27. It will be noted that the contact 19 at the apex of the acutely shaped angle of the sealing lip 17 bears against the surface 25 and perfects the seal between the piston 26 and the cylinder 24. The direction of pressure has been indicated by the arrow identified by the numeral 29. It will be noted that the side wall 14 in which the large or deep concavity 15 is formed faces in the direction from which the pressure is applied as indicated by the arrow 29. It will also be noted that the sealing lip 17 extends outwardly from the cross-sectional center 16 in a direction toward that from which the pressure is applied.

FIG. 3 shows one of my seals designed particularly for use as an internal seal such as is illustrated at the right hand side of FIG. 5. In that figure a groove 30 is formed in the portion of the cylinder through which the piston rod 31 passes. The bore surface 32 is disposed opposite to the exterior surface 33 of the piston rod and the groove faces toward the piston rod. Within the groove 30 is one of my sealing rings with the sealing lip 17 having its contacts 19 bearing against the external surface 33 of the piston rod and perfecting a seal between the rod and the cylinder. Again it will be noted that the side in which the large concavity is formed faces in the direction in which the pressure is applied and the sealing lip 17 extends outwardly relative to the cross-sectional center of the ring in the direction from which the pressure is applied. It will also be noted that the flat end 18 of the sealing lip 17 extends in a radial direction relative to the ring as is the case with the external seal shown in FIG. 2.

FIG. 4 shows one of my sealing rings of the type designed to perfect an internal seal in what is commonly referred to as a face seal. FIG. 6 shows a body 34 having a surface 35 opposed to a body 36 having an opposed surface 37 in which a groove 38 is formed. The groove 38 extends around a central opening 39 through which pressure is applied in the direction of the arrow shown and identified by the numeral 40. It will be noted in this instance that the flat end of the sealing lip extends in an axial direction relative to the sealing ring 10 but other than that its construction is highly similar to that of the ring shown in FIGS. 2 and 3. In each of these constructions the sealing ring is characterized by a generally square cross-sectional configuration three corners of which have convexly shaped lobes and the fourth corner of which utilizes a cantilever projection as a sealing lip to provide an improved function. In this connection it will be noted that at low pressure the cantilever projection provides ample pressure between the contact 19 and the surface against which it is to bear to perfect the desired seal. Since the contact 19 is disposed outwardly of the corner lobe of the adjacent side which defines the contact, this means that the lip 17 must be bent inwardly toward the large cavity 15 in assembling the same within the groove, such as the groove 28, or 30. In each instance the contact 19 is urged against the opposite surface by the inherent resiliency of the material from which the sealing ring is made to perfect the seal and the pressure supplied thereby is ample to maintain the desired seal. It will be noted that on the return stroke, which is to the left as viewed in FIG. 5, the lip 17 is moved forwardly to the left and the sharply angled contact 19 will wipe the surface clean to effectively reduce the thickness of the film of fluid which has remained on the cylinder wall. I have found that this type of sealing lip does a more efficient wiping job than the conventional convexly shaped seal which has heretofore been utilized. It should also be noted that the application of pressure is such that the pressure has ready access to the large cavity 15 which tends to urge the lip 17 outwardly and thus provide a pressure actuated seal. By the same token, when high pressure is applied to my sealing ring when installed as shown, the convexly shaped lobe 21 as viewed in FIG. 5 will function to provide a highly satisfactory seal even at such pressures. Thus a seal of this design in addition to being an effective seal at low pressure may also be utilized at high pressure so that the seal is adaptable to a wider range of circumstances.

It will be noted that since the contact 19 is supported by a cantilever projection, there is low interference and hence low friction between the sealing lip 17 and the surface 25 against which it bears. This insures ease of movement of the piston 26 and since such a function is highly desirable in instances such as automobile brakes, the seal is valuable for such usage.

It will also be noted that the sharply angled contact portion 19 of the sealing lip 17 engages only a very small contact area upon the surface 25 because of its configuration. This also reduces friction and assures ease of movement of the piston relative to the cylinder wall.

An additional advantage of my sealing ring is that because of the cantilever projection of the sealing lip 17, this sealing ring automatically compensates for wider tolerances in the construction of the groove and the spacing between the surfaces between which the seal is to be perfected. This also makes the ring more desirable in that its adaptability and usability is increased.

It will, of course, be understood that various changes may be made in the form, details, arrangement and proportions of the parts without departing from the scope of my invention which consists of the matter shown and described herein and set forth in the appended claims.

What is claimed is:
1. A fluid seal comprising,
 (a) a pair of contiguous surfaces, one of said surfaces having an annular sealing groove formed therein opposite to and facing the other of said surfaces and adapted to receive a sealing ring therein,
 (b) fluid under pressure disposed between said surfaces with the pressure applied in a predetermined direction across said groove,
 (c) and a pressure actuated sealing ring disposed within said groove and effecting a seal between said surfaces,
 (d) said sealing ring being comprised of a continuously formed ring-like member made of a resilient flowable material such as rubber throughout and adapted to be fitted into said sealing groove,
 (e) said sealing ring in its free form having a substantially rectangular cross-sectional configuration throughout its continuous extent and having a convexly shaped lobe at three of its corners between adjacent sides
 (f) said sealing ring when considered cross-sectionally having a concavity formed in each of its sides, one of said concavities being substantially deeper than the others and defining with an adjacent side an annular sealing lip extending away from the remaining two sides of said member,
 (g) two of said convexly shaped corner lobes of said ring being disposed in the bottom of said groove and said sealing lip extending outwardly from the groove and bearing against the surface disposed opposite said groove to effect a seal between said surfaces.

2. The structure defined in claim 1 wherein said sealing lip extends outwardly from the cross-sectional center of said ring toward the direction from which the pressure is applied.

3. The structure defined in claim 1 wherein said deep concavity formed in said sealing ring is formed in the side facing the direction from which the pressure is applied to said fluid.

4. The structure defined in claim 1 wherein said sealing lip in its free form extends outwardly beyond the lobed corner of said adjacent side.

5. The structure defined in claim 1 wherein each of the four sides of said sealing ring are concavely shaped and the concavity facing the direction from which the pressure is applied is substantially deeper than the others.

6. The structure defined in claim 1 wherein said sealing lip terminates at a point a greater distance away from the cross-sectional center of said member than any of its lobed corners and terminates in a flat end surface which in cooperation with said adjacent side of said ring defines an acutely angled sealing contact which bears against the said surface disposed opposite said groove.

7. A sealing device comprising:
 (a) a continuously formed ring-like member made of a resilient flowable material such as rubber throughout and adapted to be fitted into a sealing groove of ring-like configuration,
 (b) said ring-like member in its free form having a substantially rectangular cross-sectional configuration throughout its continuous extent with four concave sides and a lobe at three of its corners between adjacent sides,
 (c) the exterior surface of said lobes being convex in shape,
 (d) the concavity of one of the sides of said member being substantially greater than at any of the other of its sides and defining with the concavity of an adjacent side an annular sealing lip extending away from the remaining two sides of said members,
 (e) the greatest dimension of said lip being less than the largest cross-sectional dimension of the remainder of said rectangular member.

8. The structure defined in claim 7 wherein said lip terminates at a point a greater distance away from the cross-sectional center of said member than any one of its lobed corners.

9. The structure defined in claim 7 wherein said lip terminates at a point a greater distance away from the cross-sectional center of said member than either of its adjacent lobed corners.

10. The structure defined in claim 7 wherein said lip when considered cross-sectionally has an acutely angled sealing apex which defines a circumferentially extending sealing contact line for said member.

11. The structure defined in claim 7 wherein said lip has a flat end surface extending radially of said member.

12. The structure defined in claim 7 wherein said lip extends outwardly beyond the lobed corner of said adjacent side.

13. The structure defined in claim 7 wherein said sealing lip terminates in a flat end surface extending generally parallel to the axis of said member.

14. The structure defined in claim 7 wherein said sealing lip terminates in a flat end surface which in cooperation with said adjacent side of said member defines an acutely angled sealing contact.

References Cited by the Examiner
UNITED STATES PATENTS

| | | | |
|---|---|---|---|
| 2,173,247 | 9/39 | Bott | 277—214 |
| 2,587,794 | 3/52 | Walker et al. | 277—206 X |
| 2,686,092 | 8/54 | Neesen | 277—212 X |
| 2,873,132 | 2/59 | Tanner | 277—209 |
| 2,974,646 | 3/61 | Miller et al. | 277—174 |
| 3,052,478 | 9/62 | Horvereid | 277—209 |

FOREIGN PATENTS

| | | |
|---|---|---|
| 1,150,434 | 8/57 | France. |
| 1,186,929 | 3/59 | France. |
| 1,021,665 | 12/57 | Germany. |
| 466,618 | 6/37 | Great Britain. |
| 860,090 | 2/61 | Great Britain. |

LEWIS J. LENNY, *Primary Examiner.*

WALTER A. SCHEEL, EDWARD V. BENHAM,
*Examiners.*